United States Patent [19]

Saracsan

[11] 4,452,964

[45] Jun. 5, 1984

[54] PEROXIDE CURED URETHANES FOR APPLICATION TO RIM AND ADHESIVES

[75] Inventor: Jeffrey W. Saracsan, Akron, Ohio

[73] Assignee: The Goodyear Tire & Rubber Company, Akron, Ohio

[21] Appl. No.: 464,227

[22] Filed: Feb. 7, 1983

[51] Int. Cl.$^3$ .................... C08G 18/16; C08G 18/30
[52] U.S. Cl. ................................ 528/75; 525/454; 525/455; 525/920; 525/937; 528/50; 264/328.1
[58] Field of Search ............... 528/50, 75; 525/454, 525/455, 539, 920, 937

[56] References Cited

U.S. PATENT DOCUMENTS

| | | | |
|---|---|---|---|
| 3,553,174 | 1/1971 | Hausslein et al. | 528/50 |
| 3,557,389 | 5/1971 | Kuhar | 528/50 |
| 3,968,089 | 7/1976 | Cuscurida et al. | 528/50 |
| 4,038,257 | 7/1977 | Suzuki et al. | 528/75 |
| 4,064,194 | 12/1977 | Evans et al. | 528/75 |
| 4,097,439 | 6/1978 | Darling | 528/75 |
| 4,174,307 | 11/1979 | Rowe | 528/50 |
| 4,182,829 | 1/1980 | Walkowiak et al. | 528/50 |
| 4,233,205 | 11/1980 | O'Connor et al. | 528/50 |
| 4,264,752 | 4/1981 | Watson | 528/75 |
| 4,284,731 | 8/1981 | Moser et al. | 528/50 |
| 4,305,854 | 12/1981 | Rowe | 525/455 |
| 4,317,895 | 3/1982 | Guagliardo et al. | 525/455 |
| 4,330,657 | 5/1982 | Disteldorf et al. | 525/455 |
| 4,359,558 | 11/1982 | Gould et al. | 525/454 |
| 4,374,238 | 2/1983 | Shanoski | 528/50 |

OTHER PUBLICATIONS

Gruber et al., Ind. & Eng. Chem. 51, No. 2 (Feb. 1959), pp. 151–154.

*Primary Examiner*—H. S. Cockeram
*Attorney, Agent, or Firm*—J. D. Wolfe; R. D. Thompson

[57] ABSTRACT

A liquefiable peroxide reactive molding composition comprising a reaction product of a polyol, an organic polyisocyanate and a hydroxyl ethylenic containing compound, said liquifiable composition having a free NCO content of less than about 0.3% by weight and an organic peroxide and being useful as an injection molding composition and as an adhesive that is essentially insensitive to atmospheric moisture.

10 Claims, No Drawings

PEROXIDE CURED URETHANES FOR APPLICATION TO RIM AND ADHESIVES

TECHNICAL FIELDS

This invention relates to a liquefiable peroxide reactive molding composition comprising a reaction product of a polyol, an organic polyisocyanate and a hydroxyl ethylenic containing compound, said liquefiable composition having a free NCO content of less than about 0.3% by weight and an organic peroxide. More particularly, this invention relates to a liquefiable peroxide reactive molding composition containing an effective amount of a filler, usually 1 to 300 parts and preferably a siliceous fiber of 0.3 to about 10 centimeters and to a relatively moisture insensitive adhesive.

A composition preferably liquid for mold or liquid to semisolid for an adhesive comprising a reaction product of a polyol, an organic polyisocyanate and a hydroxyl ethylenic containing compound, said liquefiable composition having a free NCO content of less than about 0.3% by weight and an organic peroxide. Preferably the hydroxyl ethylenic compound is a hydroxyl organic substituted acrylate or methacrylate which can have alkyl radicals of less than about 21 carbon atoms per alkyl radical. The composition can have an organic peroxide content of about 0.5 to 5 parts per 100 parts of the composition or higher where the reaction product is highly viscous, it can contain therein at least one liquid ethylenic containing monomer, usually in about 0.5 to 10 parts or more of the ethylenic containing monomer with the ethylenic containing monomer being an alpha olefin containing 2 to about 20 carbon atoms. Alternately the alpha olefin is selected from the class consisting of styrene, acrylonitrile, divinylbenzene, vinyl chloride and butene. These compositions can contain from 1 to 300 parts of filler where semisolids are desired as for use as caulking and adhesive compositions. These compositions can be used with an effective amount of a silicious fiber of 0.3 to about 20 centimeters to give improved reinforced products.

PRIOR ART

Polyurethane reaction mixtures are usually used in molding various articles such as automobile parts and meat boxes to mention only a few of them. These molded polyurethanes, in many cases, should be reinforced with fillers such as silicious fibers but difficulties are experienced in mixing them uniformly in the reaction mixture and if they are not uniformly mixed the resulting polyurethanes prepared from the reaction mixture will have inferior physical properties especially in the directional sense. Also, the polyurethane reaction mixtures increase in viscosity during mixing to introduce another variable.

The conventional or prior art method of producing a urethane RIM product involves the use of one of several one-shot non-prepolymer formulations. The prior art practice uses a two component system involving meter/mix machines of a highly precise nature. Component A is usually a mixture of a polyol with a small amount of triol. Component B is the diisocyanate. A catalyst is added to kick off the reaction. Both components are metered individually into a mixing head. After thorough agitation in the mixing head the homogeneous mix is "shot" or injected into the mold where the components are allowed to react to form the finished product. The prior art method is extremely costly in equipment and also requires high precision.

DISCLOSURE AND PRACTICE OF THE INVENTION

I have discovered that the liquefiable reaction products of a polyol, an organic polyisocyanate and a hydroxyl ethylenic containing compound can be mixed with an organic peroxide and be used to mold many useful articles having improved physical properties especially when reinforced with fillers, especially of the silicious fiber type. Also, the equipment to mix and inject the mixture into the mold is relatively simple compared to the polyurethane mixing and injection equipment.

Alternately, I have discovered these liquefiable reaction products described above can be incorporated with an organic peroxide and have the viscosity adjusted if desired to give an adhesive of the polyurethane type that is relatively insensitive to atmospheric moisture. This adhesive can be spread in conventional ways but preferably is applied from a cement gun as is the customary practice in bonding of polyester fiber glass parts.

The reaction products of a polyol, an organic polyisocyanate and a hydroxyl ethylenic containing compound are well known and their preparation where the polyol is a polyether is disclosed in the following U.S. Pat. Nos. 4,057,431 issued Nov. 8, 1977, and 4,230,770 issued Oct. 28, 1980.

Not only may the well known polyether polyols be used to make the liquefiable polyurethanes by reaction with the well known organic polyisocyanates but the polyester polyols and hydrocarbon polyols especially desirable are ethylenic unsaturated hydrocarbon polyols, can be used to produce liquefiable composition that can be injection molded and peroxide cured to give very desirable products such as hoods for motor vehicles where a high modulus is needed. Also, they can be used to impregnate preplaced fibrous materials in a mold or shaper to avoid orientation defects associated with molding fibrous loaded elastomers or plastics.

High modulus samples have been prepared from 100% solids one component urethanes. The one component urethanes were prepared by reacting a polyol with a diisocyanate followed by reaction with a hydroxy acrylate, or methacrylate to give a compound with a negligible free isocyanate content. A small amount of liquid peroxide was then mixed with the compound. Alternatively the polyol, the organic polyisocyanate and the hydroxyl alkyl acrylate or methacrylate where alkyl radical contains from 2 to about 20 carbon atoms can be reacted simultaneously. Also, this reaction can occur in the presence or absence of other ethylenic unsaturated non-isocyanate reactive materials.

This final product was heated and poured or injected into a mold or other shaper. The mold preferably was placed in a heated press. A cross-linking reaction took place in the mold at 300° F. (149° C.) during a 3 minute interval. The casting on cooling possessed a high modulus.

Many samples were prepared using this method having a varying range of properties. A high strength sample was prepared from 4.0 R$_V$ 535 MW HOP (hexane diol orthophthalate)/IPDI (isophoronediisocyanate)/HEMA (hydroxyethyl methacrylate) mixed with 16.5 parts of 2100 equivalent weight epoxy resin and cured with 1 part DTBP (di-t-butyl peroxide) giving a flexural modulus of 394,000 psi. The sample with the best impact resistance was prepared from 2.0 R$_V$ 532 molecular weight polycaprolactone diol/Mondur PF ™ (modified 4,4' methylene bis phenyl isocyanate)/HEMA cured with 1 part TBP (t-butyl perbenzoate) giving a notched Izod impact of 3.21 ft-lbs/in.

The approach of the instant invention embodiment uses a peroxide cured urethane acrylate or methacrylate RIM type system which does not use a two component meter/mix machine. Instead, the acrylated urethane with the peroxide is placed in a suitable holding container. The material is heated to the desired viscosity and degassed. A metered amount of this one-component material is then injected into the heated mold where it is allowed to react for a short time. The part is demolded.

The possible benefits from this new approach to RIM are many-fold. For instance, from a processing standpoint (1) a two-component metering machine is not needed. This eliminates the possibility of being off-ratio where two or more materials have to be precisely mixed in stoichiometric amounts. (2) No need has been found for a post cure of the molded parts.

This invention develops a "new" urethane technology by marrying two types of polymerizations into one cured compound: condensation and free radical. Also, it offers the ability to make glass fiber, or other fabric including wire reinforced shaped articles relatively easy and free of directional differences.

In general, in a preferred embodiment the polyol is reacted with the diisocyanate (in excess) to form a prepolymer (PP) with free isocyanate. This prepolymer is next reacted with the acrylate monomer at which time the hydroxyl group on the acrylate molecule combines with all of the free isocyanate available from the prepolymer molecule. Acrylate terminated polymer chains are produced. The acrylate chains are crosslinked at the ends after the peroxide is added. The peroxide used does not actually enter into the structure of the finished crosslinked compound, but instead, promotes the cure (with heat) by the initiation of free radicals at the carbon to carbon double bonds. The free radicals recombine to form carbon to carbon crosslinks between polymer chains. Some of the formulation variables are polyol, organic polyisocyanate, ethylenic monomer or polymer, and the organic peroxides. The polyols are the well known polyethers, polyesters, and hydrocarbon polyols or blends of these of the aliphatic or aromatic type having molecular weights of about 500 to 6000 and preferably of 1000 to 4000 used to react with organic polyisocyanates to make urethanes.

The organic polyisocyanates are well known and belong to the class of aromatic, alicylic or aliphatics and are represented by toluene diisocyanates, MDI and Isophoronediisocyanate (IPDI)

4,4' methylene bis cyclohexyl isocyanate (Hylene W ™)
Polymeric MDI (Mondur PF ™)
4,4' methylene bis phenyl isocyanate (MDI)
2,4-2,6 toluene diisocyanate (TDI)
Tolidine diisocyanate (TODI) or the polymeric isocyanate or quasi isocyanate.

Representative examples of these reactive polyols are the following:
Polycaprolactone diol
Polytetramethylene ether glycol (Teracol ™)
Hexanediol ortho phthalate (diol) (HOP)
Polypropylene polyethylene ether diol
Hexanediol adipate (diol)

Representative hydroxyalkylmethacrylates are those where the hyroxyl radical is hydroxyl ethyl, hydroxylpropyl or any of those where hyroxylalkyl contains 2 to 20 carbon atoms.

Representative peroxides are t-butyl perbenzoate (TBP) di-tertiary butyl peroxide (DTBP) and those well known to the polymerization art.

EXAMPLE 1

Preparation of the Urethane Acrylate

First 700 parts of 535 molecule weight, polyhexyl orthophthalate were added to a glass resin kettle. A heating mantel was used to supply heat. The pot was also fitted with a thermometer and motorized stirrer. While stirring, the polyol was heated to 162° F. (72° C.) to degass at which temperature, 570 parts of isophorone diisocyanate (IPDI) were added. The temperature dropped to 130° F. (54° C.), but after 10 minutes began to rise again. Ten minutes later the material had exothermed to a peak temperature of 260° F. (127° C.) The prepolymer was allowed to react fully for 45 minutes with continuous stirring without heating. Two parts of hydroquinone were added next to stabilize the acrylate to be added in the subsequent phase of the reaction. The prepolymer was cooled further to 160° F. (71° C.) at which temperature, 367 parts of HEMA were added to completely react with the theoretical amount of free isocyanate available from the prepolymer. The temperature dropped to 150° F. (66° C.). A tin catalyst (T832) was added to the stirred material in the amount of 64 drops, the material exothermed to a peak temperature of 184° F. (84° C.) in 5 minutes. The material was then cooled to room temperature. After the acrylated urethane was allowed to sit at room temperature for 18 hours, an analysis for any residual amount of isocyanate was made. The % free NCO was 0.11. Four grams of butanol (a slight excess) were added to the reheated material to quench the remaining NCO groups. The viscous liquid was then poured into two glass quart jars which were then sealed.

Molding the Sample. This procedure is typical of what was followed and the above material is used in the example. One of the quart jars containing the acrylated urethane was heated to 140° F. (60° C.). 100 parts of the material were poured into a glass beaker followed by 16.5 parts of 2100 equivalent weight epoxy resin. The mixture was stirred and heated at which temperature one part of liquid peroxide (DTBP) was added. With continued stirring the beaker contents were heated to 190° F. (88° C.). The beaker was placed in a degassing pot where the material was degassed for about 3 minutes. The material was then poured into a test mold released steel cavity lying in a horizontal position. After the mold cavity was overfilled slightly, the top (mold released) steel plate was gently lowered over the mold and the entire combination was placed in a 300° F. (149° C.) press. 50,000 pounds of pressure were applied. Thirteen minutes were allowed for the cure—ten minutes of which allowed for the material in the mold to reach press temperature. The press was then opened. The sample, although somewhat soft, was removed easily from the hot mold. On cooling to room temperature the sample sheet became a hard, stiff plastic.

EXAMPLE 2

A number of polyurethane prepolymers were made using the organic polyisocyanate and polyols listed in Table I using the procedure of Example 1 and then extended with hydroxyl ethyl methacrylate viz HEMA and then cast into test samples after addition of the peroxide curative (TBP) and cured at 300° F. (149° C.). The flexural modulus on the cured samples are shown in Table I.

TABLE I

All 2.0 R$_V$; HEMA extended; and TPB cured 300° F. (149° C.)

| Basic Compound | Flexural Modulus ($\times 10^3$ psi) |
|---|---|
| 532 MW Lactone/IPDI | 51 |
| 532 MW Lactone/IPDI + 10 parts C600* | 23 |
| 650 MW Teracol/Hylene W ™ | 20 |
| 532 MW Lactone/Mondur PF ™ | 120 |
| 532 MW Lactone/IPDI + 16.5 parts 2100 epoxy | 30 |

*C600 designates ethylene glycol dimethyacrylate, also other polyol methacrylates or acrylates having molecular weight from 600 to 10000 can be used.

Table II shows test results on cured composition made according to the proceding examples.

TABLE II

All 2.0 R$_V$; HEMA extended; and TBP cured (149° C.)

| Number Basic Compound | Flex Mod ($\times 10^3$ psi) | Notched Izod Impact (ft-lbs/in) | CLTE* ($\times 10^{-5}$ in/in °C.) |
|---|---|---|---|
| 532 MW Lactone/Mondur PF ™ | 120 | 3.21 | 7.2 |
| 532 MW Lactone/IPDI +16.5 parts 2100 epoxy +10.0 parts acrylonitrile | 73 | 3.20 | 10.0 |
| 535 NW HOP/IPDI +16.5 parts 2100 epoxy | 243 | 0.16 | 4.9 |
| 535 MW HOP/IPDI³ +16.5 parts 2100 epoxy (DTBP) cured | 153 | 0.27 | 6.3 |
| 535 MW HOP/IPDI +16.5 parts 2100 epoxy (DTBP) cured. +10.0 parts acrylonitrile | 144 | 0.34 | 7.2 |
| 535 MW HOP/IPDI (4.0 R$_V$)⁴ +16.5 parts 2100 epoxy (DTBP) cured. | 394 | 0.09 | 6.3 |

*Co-efficient of linear thermal expansion

EXAMPLE 3

A urethane acrylate composition was made using the method of Example 1 at 2.0 R$_V$ isocyanate to polyol ratio using a 532 molecular weight polycaprolactone isophorone diisocyanate (IPDI) and hydroxylethyl methacrylate. A hundred parts by weight of the above urethane acrylate composition was mixed with 16.5 parts by weight of about 2000 molecular weight epoxy resin, preferably of bis-(phenol A) type and about 1 part of ditertiary butyl peroxide to form the adhesive. This adhesive was used to adhere various polyester fiber glass impregnatic substrates (SMC or HMC) in lap shear adhesion test. The substrates (2.54 cm×2.54 cm) were wiped with methylethyl ketone and then primed with a methylene chloride solution of blend of triethylene diamine and a poly(methane diphenyl isocyanate). Then adhesive was applied to the primed substrates and spring led with 30 mil diameter glass beads to space the substrate when placed in overlapped cross relationship. The overlapped crossed substrates were cured 15 minutes at 149° C. and then cooled to room temperature before being pulled to determine the adhesion. The results of these pull tests are shown in Table III where SMC is polyester impregnated fiberglass and HMC is a high modulus compound lactone. These tests show this adhesive is satisfactory for metals and plastics such as polyesters, vinyls, acrylates and urethanes. Also, it is desirable when viscosity of the adhesive or composition is relatively high to use diluents to adjust the viscosity to aid its application. Reactive diluents such as the acrylate or methacrylates of the glycols and polyether glycols or triols can be used to adjust the viscosity and may be included in preparation of the urethane composition and thus increase cure sites containing unsaturation.

TABLE III

LAP SHEAR ADHESION RESULTS

| Sample | Adhesion (psi) | Type of Failure |
|---|---|---|
| Room temperature lap shear adhesion results for 2.0 R$_V$ 532 Molecular Weight Lactone/IPDI/HEMA with DTBP | | |
| SMC from Rockwell Inter | 345 | Plastic Tore; both laminates |
| HMC from GMC-T & C | 250 | Adhesive failure; looks like primer sticks to adh. and not to HMC |
| HMC from Dow Derakane | 680 | Adhesive failure; but also some tearing of HMC fibers |
| J-479-SMC from Goodyear Jackson | 630 | Plastic tore; both laminates |
| A 650 MC Polymeg (tetramethylene ether glycol) adhesive version | | |
| SMC from Rockwell Inter | 510 | Plastic tore; both laminates |

I claim:

1. A liquefiable peroxide reactive molding composition consisting essentially of a reaction product of a polyol, an organic polyisocyanate and a hydroxyl ethylenic containing compound, said liquifiable composition having a free NCO content of less than about 0.3% by weight and about 0.5 to about 5 parts of an organic peroxide per 100 parts of said composition.

2. The composition of claim 1 wherein the hydroxyl ethylenic compound is a hydroxyl organic substituted acrylate or methacrylate.

3. The composition of claim 2 wherein the hydroxyl organic substituted acrylate or methacrylate is a hydroxyl alkyl acrylate or methacrylate having less than 21 carbons in the alkyl radical.

4. The composition of claim 1 wherein the reaction product contains therein at least one ethylenic containing monomer in the amount of about 0.5 to about 10 parts of said monomer per 100 parts of said composition.

5. The composition of claim 4 wherein the ethylenic containing monomer is an alpha olefin containing 2 to about 20 carbon atoms.

6. The composition of claim 5 wherein the alpha olefin is selected from the class consisting of styrene, acrylonitrile, divinylbenzene, vinyl chloride and butene.

7. The composition of claim 1 containing from 1 to 300 parts of filler.

8. The composition of claim 1 containing a siliceous fiber of 0.3 to about 20 centimeters in an amount of 1 to 300 parts per 100 parts of composition.

9. A hot curing adhesive consisting essentially of a peroxide reactive composition comprising a reaction product of a polyol, an organic polyisocyanate and a hydroxyl ethylenic containing compound, said composition having a free NCO content of less than about 0.3% by weight and about 0.5 to about 5 parts of an organic peroxide per 100 parts of said composition.

10. The adhesive of claim 9 containing an ethylenic containing monomer in the amount of about 0.5 to about 10 parts of said monomer per 100 parts of said composition.

* * * * *